US010068086B2

(12) United States Patent
Andreeva et al.

(10) Patent No.: US 10,068,086 B2
(45) Date of Patent: Sep. 4, 2018

(54) SYSTEM AND METHOD OF AUTOMATIC PASSWORD RECOVERY FOR A SERVICE

(71) Applicant: YANDEX EUROPE AG, Lucerne (CH)

(72) Inventors: Ekaterina Aleksandrovna Andreeva, Saint-Petersburg (RU); Alexey Andreevich Goncharov, Protvino (RU); Aleksandra Arsenyevna Epifanovskaia, Krasnogorsk (RU); Ilya Gennadievich Levinson, Moscow (RU); Yury Alekseyevich Leonychev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 5 days.

(21) Appl. No.: 14/939,002

(22) Filed: Nov. 12, 2015

(65) Prior Publication Data
US 2016/0092671 A1 Mar. 31, 2016

Related U.S. Application Data

(63) Continuation of application No. PCT/IB2014/066606, filed on Dec. 4, 2014.

(51) Int. Cl.
*G06F 17/30* (2006.01)
*G06F 7/04* (2006.01)
(Continued)

(52) U.S. Cl.
CPC .............. *G06F 21/46* (2013.01); *G06F 21/41* (2013.01)

(58) Field of Classification Search
CPC .................................. G06F 21/46; G06F 21/41
(Continued)

(56) References Cited

U.S. PATENT DOCUMENTS 4,318,174 A 3/1982 Suzuki et al.
7,428,750 B1 9/2008 Dunn et al.
(Continued)

FOREIGN PATENT DOCUMENTS

CN 2831235 Y 10/2006
CN 20121472681 A 3/2013
(Continued)

OTHER PUBLICATIONS

International Search Report from PCT/IB2014/066606; Blaine R. Copenheaver; dated Apr. 2, 2015.
(Continued)

*Primary Examiner* — Dant Shaifer Harriman
(74) *Attorney, Agent, or Firm* — BCF LLP

(57) ABSTRACT

A system and method for automatic password recovery for one or more web services comprising: obtaining user registration data and a request password restoration, determining a first security question associated with a first complexity factor, causing the first security question to be asked to the user, obtaining the first user's answer and assigning a first weighting factor thereto, the first weighting factor depending on the first complexity factor determining a second security question associated with a second complexity factor, causing the second security question to be asked to the user, obtaining the second user's answer and assigning a second weighting factor thereto, the second assigned weighting factor depending on the second complexity factor, adding up the first weighting factor and the second weighting factor, if the sum exceeds a given threshold, automatically restoring the password and if the sum is below the given threshold, denying automatic password restoration.

17 Claims, 2 Drawing Sheets

(51) Int. Cl.
*G06F 15/16* (2006.01)
*H04L 29/06* (2006.01)
*G06F 21/46* (2013.01)
*G06F 21/41* (2013.01)

(58) Field of Classification Search
USPC .......................................................... 726/6
See application file for complete search history.

(56) References Cited

U.S. PATENT DOCUMENTS

| | | | |
|---|---|---|---|
| 7,849,323 B2 | 12/2010 | Field et al. | |
| 8,132,265 B2 | 3/2012 | Wooton et al. | |
| 8,429,760 B2 | 4/2013 | Tribble | |
| 8,555,357 B1 | 10/2013 | Gauvin | |
| 8,584,221 B2 | 11/2013 | Mazur et al. | |
| 2005/0039057 A1* | 2/2005 | Bagga ..................... | G06F 21/40 726/19 |
| 2007/0124321 A1 | 5/2007 | Szydlo | |
| 2009/0187962 A1* | 7/2009 | Brenneman ............ | G06F 21/316 726/1 |
| 2009/0241201 A1* | 9/2009 | Wootton .................. | G06F 21/31 726/28 |
| 2009/0288150 A1* | 11/2009 | Toomim .............. | G06F 21/6218 726/5 |
| 2010/0199338 A1 | 8/2010 | Craddock et al. | |
| 2010/0293608 A1* | 11/2010 | Schechter ............ | G06F 17/2785 726/8 |
| 2011/0191838 A1* | 8/2011 | Yanagihara ............. | G06F 15/16 726/7 |
| 2012/0124664 A1* | 5/2012 | Stein ....................... | G06F 15/16 726/22 |
| 2012/0214442 A1 | 8/2012 | Crawford et al. | |
| 2013/0080520 A1* | 3/2013 | Kiukkonen ............ | G06Q 50/01 709/204 |
| 2013/0160098 A1* | 6/2013 | Carlson ................... | G06F 21/45 726/6 |
| 2013/0198822 A1 | 8/2013 | Hitchcock et al. | |
| 2013/0254875 A1* | 9/2013 | Sama ...................... | G06F 21/31 726/19 |
| 2013/0311245 A1* | 11/2013 | Blackburn ....... | G06Q 10/06393 705/7.39 |
| 2014/0067474 A1* | 3/2014 | Deo ................... | G06Q 30/0203 705/7.32 |
| 2015/0229664 A1* | 8/2015 | Hawthorn ........... | H04L 63/1433 726/25 |

FOREIGN PATENT DOCUMENTS

| | | |
|---|---|---|
| EP | 2472423 A1 | 7/2012 |
| JP | 2003242114 A | 8/2003 |
| RU | 2179737 C1 | 2/2002 |
| RU | 2186420 C1 | 7/2002 |
| RU | 2296361 C1 | 3/2007 |
| RU | 2402882 C2 | 4/2010 |
| WO | 2003100629 A1 | 12/2003 |
| WO | 2005059893 A2 | 6/2005 |

OTHER PUBLICATIONS

English abstract of JP2003424114 retrieved from Espacenet on Nov. 12, 2015.

English abstract of CN20121472681 retrieved from Espacenet on Nov. 12, 2015.

\* cited by examiner

SYSTEM AND METHOD OF AUTOMATIC PASSWORD RECOVERY FOR A SERVICE

CROSS-REFERENCE

The present application claims convention priority to Russian Patent Application No. 2014139151, filed Sep. 29, 2014, entitled "СИСТЕМА И СПОСОБ АВТОМАТИЧЕСКОГО ВОССТАНОВЛЕНИЯ ПАРОЛЯ К СЕРВИСУ" (SYSTEM AND METHOD OF AUTOMATIC PASSWORD RECOVERY FOR A SERVICE) and is a continuation of International Application No. PCT/IB2014/066606 filed on Dec. 4, 2014, entitled "SYSTEM AND METHOD OF AUTOMATIC PASSWORD RECOVERY FOR A SERVICE", the entirety of both of which are incorporated herein by reference.

TECHNICAL FIELD

The present technology pertains to a system and method of automatic password recovery for a service.

BACKGROUND

In modern computer technologies, password recovery is a routine task. Many users lose the passwords to the services which they are using.

Password recovery can be done by going to the user support centers (in person, by telephone, and so on) and dealing with the user support services specialists.

Password recovery can also be done automatically, when the computer asks questions of the user of the service and checks the correctness of the answers by comparing them with possible correct answer options contained in databases.

Various mechanisms of password recovery exist in the current prior art.

One of the methods involves asking a first question of the person initiating the password recovery procedure. A second question can be asked of this person only if they correctly answered the first question asked (see, for example, U.S. Pat. No. 8,132,265 B2 "Techniques for multilingual password challenge response, password reset, and/or password recovery").

Certain service providers ask a series of questions, but it is usually enough to correctly answer at least one question for restoration of access.

Thus, while the currently existing ordinary computer systems are acceptable, an improvement in these systems is still possible.

SUMMARY

The aim of the present technology is to eliminate or mitigate at least some of the inconveniences present in the existing prior art.

According to a first broad aspect of the present technology, there is provided a method of automatic password recovery. The method comprises: (i) obtaining, via a communication network, user registration data and a request password restoration; (ii) determining of a first security question for the user, the first security question being associated with a first complexity factor; (iii) causing the first security question to be asked to the user; (iv) responsive to the first security question, obtaining the first user's answer; (v) assigning a first weighting factor to the first user's answer, the first assigned weighting factor of the user's answer depending on the first complexity factor of the first security question; (vi) determining of a second security question to be asked of the user, the second security question being associated with a second complexity factor; (vii) causing the second security question to be asked to the user; (viii) responsive to the second security question, obtaining the second user's answer; (ix) assigning a second weighting factor to the second user's answer, the second assigned weighting factor of the user's answer depending on the second complexity factor of the second security question; (x) adding up the first weighting factor and the second weighting factor; (xi) if the sum of the first weighting factor and the second weighting factor exceeds a given threshold, automatically restoring the password; (xii) if the sum of the first weighting factor and the second weighting factor is below the given threshold, denying the automatic password restoration.

In certain embodiments of the technology, the first security question and the second security question are security questions from a group of security questions, each security question from the group of security questions being included in at least one list of security questions, wherein each list of security questions from the group of lists of security questions is associated with at least one service associated with the user registration data.

In certain embodiments of the technology, at least one of the security questions included in the list of security questions are generated based on the parameters of the user's account record in the service, with which a corresponding list of security questions is associated.

In certain embodiments of the technology the determining of the user's security question is executed by selecting a security question from the list of security questions, the list of security questions being associated with the service associated with the user registration data.

In certain embodiments of the technology, the selection of the security question from the list of security questions associated with at least one service associated with the user registration data is executed in a random order.

In certain embodiments of the technology, the user registration data is associated with at least two services, and the first security question and the second security question are selected respectively from a first list of security questions and a second list of security questions, the first list of security questions and the second list of security questions being associated respectively with the first service and the second service.

In certain embodiments of the technology, each security question from the group of security questions has a corresponding complexity factor, the corresponding complexity factor of each security question from the group of security questions being predetermined.

In certain embodiments of the technology, the method further comprises correction of the corresponding complexity factor of the corresponding security question based on statistics of the answers of previous users to the corresponding security question.

In certain embodiments of the technology, the first security question and the second security question are parts of a group of security questions, and the maximum number of security questions asked of the user in the course of one password recovery session is predetermined.

In certain embodiments of the technology, when the sum of the first weighting factor and the second weighting factor is below the predetermined threshold, the method further comprises: (i) determining of whether the number of security questions asked has reached the maximum permitted number of security questions, (ii) if the number of security questions asked has reached the maximum permitted number of security questions, denying automatic password restoration, (iii) if the number of security questions asked is below the maximum permitted number of security questions, causing a third security question to be asked to the user.

In certain embodiments of the technology, the method further comprises: (i) responsive to the third security question, obtaining the third user's answer; (ii) assigning to the third user's answer a third weighting factor, the assigned third weighting factor being dependent on a third complexity factor of the third security question, and the third security question being selected from one of: (a) the first list of security questions, and (b) the second list of security questions, and (c) a third list of security questions, the third list of security questions being associated with one of: the first service, and the second service, and a third service associated with the user registration data.

In certain embodiments of the technology, the weighting factor of the user's answer being assigned to the corresponding user's answer to the corresponding security question further depends on the degree of accuracy of the corresponding user's answer to the corresponding security question.

In certain embodiments of the technology, the method further comprises a parameter of accuracy of the user's answer.

In certain embodiments of the technology, when the ratio of correct and incorrect answers to the corresponding security question, the answers being given by the user and by previous users, exceeds a predetermined value, the method further comprises eliminating the corresponding security question from at least one of the lists of security questions.

According to another aspect of the present technology, there is provided a computer. The computer comprises a processor. The processor is configured so that the computer can: (i) obtain via communication network the user registration data and the password recovery request; (ii) determine a first security question of the user, the first security question being associated with a first complexity factor; (iii) cause the first security question to be asked to the user; (iv) responsive to the first security question, obtain the first user's answer; (v) assign to the first user's answer a first weighting factor, the assigned first weighting factor of the user's answer depending on the first complexity factor of the first security question; (vi) determine a second security question to ask the user, the second security question being associated with a second complexity factor; (vii) cause the second security question to be asked to the user; (viii) responsive to the second security question, obtain the second user's answer; (ix) assign a second weighting factor to the second user's answer, the assigned second weighting factor of the user's answer depending on a second complexity factor of the second security question; (x) add the first weighting factor and the second weighting factor; (xi) if the sum of the first weighting factor and the second weighting factor exceeds a predetermined threshold, automatically restore the password; (xii) if the sum of the first weighting factor and the second weighting factor is below the predetermined threshold, deny the automatic password restoration.

In certain embodiments of the technology the first security question and the second security question are security questions from a group of security questions, each security question from the group of security questions being included in at least one list of security questions, wherein each list of security questions from the group of lists of security questions is associated with at least one service associated with the user registration data.

In certain embodiments of the technology at least one of the security questions included in the list of security questions are generated based on the parameters of the user's account record in the service, with which a corresponding list of security questions is associated.

In certain embodiments of the technology the determining of the user's security question is executed by selecting a security question from the list of security questions, the list of security questions being associated with the service associated with the user registration data.

In certain embodiments of the technology the selection of the security question from the list of security questions associated with at least one service associated with the user registration data is executed in a random order.

In certain embodiments of the technology the user registration data is associated with at least two services, and the first security question and the second security question are selected respectively from a first list of security questions and a second list of security questions, the first list of security questions and the second list of security questions being associated respectively with the first service and the second service.

In certain embodiments of the technology, each security question from the group of security questions has a corresponding complexity factor, the corresponding complexity factor of each security question from the group of security questions being predetermined.

In certain embodiments of the technology, the method further comprises correction of the corresponding complexity factor of the corresponding security question based statistics of the answers of previous users to the corresponding security question.

In certain embodiments of the technology, the first security question and the second security question are parts of a group of security questions, and the maximum number of security questions asked of the user in the course of one password recovery session is predetermined.

In certain embodiments of the technology when the sum of the first weighting factor and the second weighting factor is below the predetermined threshold, the method further comprises: (i) determining of whether the number of security questions asked has reached the maximum permitted number of security questions, (ii) if the number of security questions asked has reached the maximum permitted number of security questions, denying of automatic password restoration, (iii) if the number of security questions asked is below than the maximum permitted number of security questions, asking a third security question of the user.

In certain embodiments of the technology, there is also done: (i) responsive to the third security question, obtaining the third user's answer; (ii) assigning to the third user's answer a third weighting factor, the assigned third weighting factor being dependent on a third complexity factor of the third security question, and the third security question being selected from one of: (a) the first list of security questions, and (b) the second list of security questions, and (c) a third list of security questions, the third list of security questions being associated with one of: the first service, and the second service, and a third service associated with the user registration data.

In certain embodiments of the technology, the weighting factor of the user's answer being assigned to the corresponding user's answer to the corresponding security question further depends on the degree of accuracy of the corresponding user's answer to the corresponding security question.

In certain embodiments of the technology, a nonvolatile information storage medium additionally contains a parameter of accuracy of the user's answer.

In certain embodiments of the technology, when the ratio of correct and incorrect answers to the corresponding security question, the answers being given by the user and by previous users, exceeds a predetermined value, there is also done an eliminating of the corresponding security question from at least one of the lists of security questions.

In the context of the specification of the present technology, "server" is a program executed on corresponding equipment and capable of receiving requests (for example, those sent by client devices) which are transmitted by a network, and of fulfilling these requests or arranging for their fulfillment. Equipment can be one computer or one computer system, although neither is mandatory in regard to the proposed technology. In a given context, the phrase "server" does not mean that each task (such as the task represented by the received instructions or requests) or some particular task will be received, executed, or arranged to be executed by the same server (that is, the same software and/or hardware); it is assumed that the reception and transmission, the fulfillment or arranging for the fulfillment of any task or request or the processing of the results of a task or request can be done by any given number of software components or devices and all these software or hardware components can be represented by a single server or several servers, while the phrase "at least one server" covers both of these variants.

In the context of the specification of the present technology, "client device" is any computer equipment making it possible to execute software designed to handle the requested task. In the context of the present specification, the term "client device" is basically associated with the user of a client device. Some (not limiting) examples of client devices include personal computers (desktop computers, portable computers, netbooks, and so on), smartphones and tablets, as well as network hardware, such as routers, switches and gateways. It should be noted in this context that the fact that a device is functioning as a client device does not rule out its possible functioning as a server for other client devices. The use of the term "client device" does not prevent the use of several client devices in the process of receiving and transmitting, executing or arranging for the execution of a task or request or the processing of the results of a task or request or the steps of the method presented in this specification.

In the context of the specification of the present technology, the term "database" constitutes any structured set of data, independently of the particular structure, the database management program, or the hardware on which the data storage is carried out, the memory is realized, or the possibility of using data is otherwise provided. A database can be realized on the same hardware as the process realizing the storage or use of the information recorded in the database, or on separate hardware, such as a dedicated server or group of servers.

In the context of the specification of the present technology, the term "information" includes information of any given nature or type, which can be recorded in a database. Thus, information encompasses, among other things, audio-visual information (images, films, sound recordings, presentations, and so on), data (location data, numerical data, and so on), text information (statements, comments, questions, messages, and so on), documents, spreadsheets, and so on.

In the context of the specification of the present technology, the term "component" encompasses software (corresponding to particular hardware) which is at the same time necessary and sufficient to the execution of a particular indicated function(s).

In the present specification, the term "information storage medium intended for use by a computer" encompasses storage media of any given nature and type, including RAM, ROM, disks (compact disks, DVD disks, floppy disks, hard disks, and so on), USB keys, solid state drives, tape drives, and so on.

In the present specification the words "first", "second", "third" and so on are used only as descriptive elements for purposes of separating substantives which are different from each other and not for the purpose of determining some particular relationship between these substantives. Thus, for example, it should be understood that the terms "first server" and "third server" do not signify the introducing of a particular sequence, type, chronology, hierarchy or ranking (for example) of a particular server or several servers, and their use (in itself) does not mean that in some particular situation there must necessarily exist a "second server". Furthermore, as indicated in the present specification with regard to other examples of implementing the technology, a reference to "first" element and "second" element does not signify that the two elements cannot in fact constitute the same element in the real world. Thus, for example, in certain cases a "first" server and "second" server may constitute the same software and/or hardware component, and in other situations they may be realized on different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as its other aspects and features, one should refer to the following specification, which should be used together with the appended drawings, in which.

DETAILED DESCRIPTION

Figure 1:
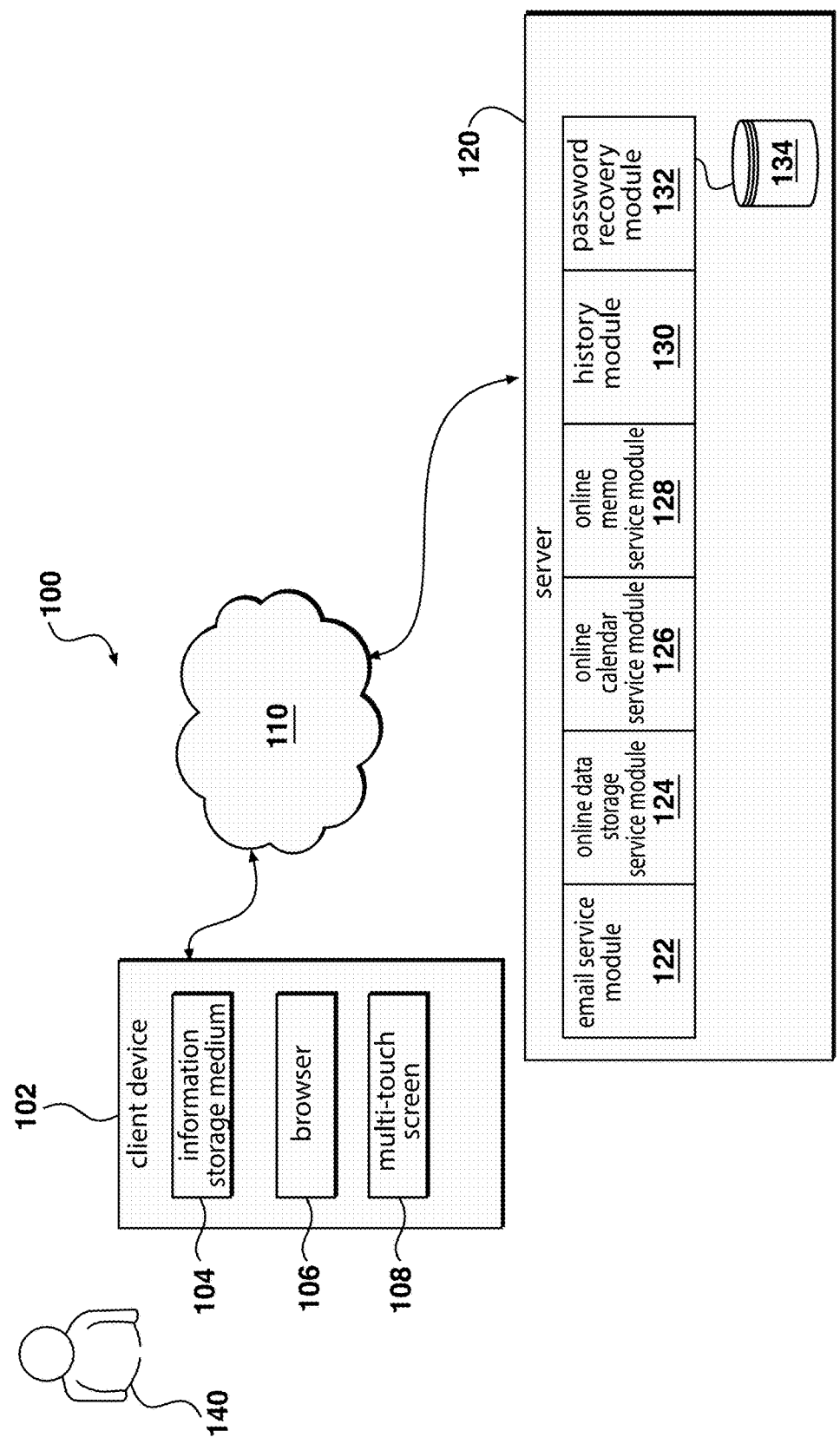
FIG. 1 is a schematic representation of a network computer system implemented in accordance with non-limiting embodiments of the present technology.

FIG. 1 shows a basic diagram of various network computer systems 100, which are linked to one another with the aid of a communication network 110. It is to be expressly understood that the network computer system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the network computer system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the network computer system 100 may provide in certain instances simple implementations of the present technology, and that where such is the case they have been presented in this manner as an aid to understanding. As persons skilled in the art would understand, various implementations of the present technology may be of a greater complexity.

FIG. 1 shows symbolically a user 140 of services.

The user 140 is the person who is using some or all of the services made available by the service provider (not shown), whose provision is executed by the server 120.

In this embodiment of the present technology, the user 140 can be a user of three services residing on the server 120, namely: email, an online data storage ("cloud data storage"), and an online calendar.

The user 140, like all the other users of the email service, makes use of a standard group of folders: "Incoming", "Outgoing", "Drafts", "Deleted", "Unwanted mail".

Like the other users of the email service, the user 140 can create his or her own folders in addition to the standard folders. For example, the user 140 can be a student at the University of Quebec in Montreal and can create the folder "UQàM" (the abbreviation of Université du Québec a Montréal) in order to hold messages forwarded to him from his university email.

Besides this, additional folders can be created by outside applications, such as the folder "McAffee Anti-Spam", which can hold messages recognized by the McAfee® Anti-Spam filter as being unwanted mail.

Like the other users of the email service, the user 140 can create email message categories, such as the categories "Bills", "Family", "Bank", "Correspondence with the Tax Office", and so on. He can then assign categories to one email message or another, thereby making it easier to find the needed email messages in future.

Further, like the other users of the email service, the user 140 can assign a higher or lower level of importance to certain messages being sent, and also label certain of the incoming messages with flags.

If the user 140 intends to take control over a particular matter contained in an email message, he can make an automatic reminder, indicating the date and time when this reminder should appear on the screen 108 of the client device 102.

Besides this, the user 140, also like any other user of the email service, has the ability of selecting different options in the "Settings" section. For example, the user 140 can select the language of the interface, the color of the interface, the time zone, and so on.

In some examples, the users of the email service do not avail themselves of all the options and possibilities which are potentially available to them. Therefore, another user of the email service does not know precisely which options have been utilized by the user 140, nor precisely how the user 140 made use of one option or another. For example, the other user of the email service cannot know whether the user 140 created files not provided by default, and if so, what he has named them.

As was indicated above, the user 140 can be a user of the online data storage service. The user 140 can have various folders in his online data storage. Some of the folders can be default folders, such as "My documents", "My photographs", and "Recent documents". The user 140 can additionally create user folders and give them names of his choosing. For example, he can create folders "Scans of my documents", "Graduation ceremony", "Physics assignments". Due to the fact that the user folders of each user of the online data storage service are created independently by each user at his or her own discretion, the number of user folders of the various users, and also the names of these folders, will generally be different (except for cases of random coincidence).

The user 140 can save files of different type in the default folders and the user folders, such as documents in Microsoft Word format with extensions ".doc", ".docx", and others; PDF (Portable Document Format), RTF (Rich Text Format), TXT and others; presentations in Microsoft PowerPoint format; spreadsheets in Microsoft Excel format; photographs in JPEG format; other pictures in formats GIF, BMP, and so on. For example, the user 140 can save documents in PDF format in the folder "Scans of my documents", photographs in JPEG format in the folder "Graduation ceremony", and documents in DOC and PDF format in the folder "Physics assignments".

The user 140, when saving user files in the online data storage, assigns names to them. In some examples, the names of the files of different users are different, except for random coincidences, and also except for cases when files come from the same source and when they have been saved without changing the name. There can also be other circumstances in which the names of files might be identical or similar (for example, when files are downloaded from a certain type of device—such as a scanner or camera).

In addition, the user 140 can make captions beneath the photographs which he places in the online data storage. For example, the user 140 can place a photograph of the university library, accompanying it with the caption "Library after repair". In some examples, the photograph captions of different users will be different. Other users of the online data storage generally do not know which files are being kept in the online data storage of the user 140, what names he has assigned to them, when he last saved them, the last several files he worked with, and what captions he placed on photographs (provided that the user 140 did not give access to certain other users to some or all of the folders in his online data storage).

As indicated above, the user 140 can be a user of an online calendar service. This service allows the user to save data on events and make reminders.

Events in the online calendar can be single or recurring. A high importance can be assigned to certain events.

Certain events can be created by the user himself 140, and others can be received by him via email and accepted by him. Accordingly, many people may be aware of some events, while only the user 140 might be aware of certain events.

As will be understood by the person skilled in the art, the choice of the services which are being used by the user 140 and whose implementation in the given embodiment can be executed by the server 120 has been made randomly and solely for purposes of illustrating non-limiting embodiments of the present technology. It should be clear that the services provided can be entirely different ones. For example, in alternative embodiments, as several nonlimiting examples, the user 140 of the service can be the user of a corporate electronic portal, the user of an electronic portal of an educational establishment, the user of an Internet banking, the user of a telephone banking, the user of a search engine, the user of a paid electronic library, the user of an Internet magazine, and so on. The user may create other user data, known with high likelihood only to him, in the course of using these services.

For example, generally only the user of a telephone banking service can know the fund balance in his account and can state several of the recent transactions. The services provided can make use of any given kinds of telecommunications, not necessarily by means of the Internet or some other computer network. For example, they can be telephone services, online services, hybrid services, and other services making possible a two-way (or multilateral) exchange of information.

The service user 140 should be registered on at least one of the services made available by the service provider or group of service providers. He should have the same user account record, or different user account records should be linked with each other.

Returning to the system 100, the system 100 includes a client device 102. The client device 102 is usually associated, as indicated above, with the service user 140.

It should be noted that the fact that the client device 102 is connected to the service user 140, and the service user 140 is registered on at least one of the services, does not imply some particular mode of operation of the client device 102.

The variants of the client device 102 are not specifically limited. Some of the examples of possible implementations of the client device 102 include: personal computers (desktop computers, portable computers, netbooks, and so on), wireless communication devices (mobile telephones, smartphones, tablets, and so on) as well as network hardware (routers, switches or gateways). In FIG. 1, the client device 102 is realized as a smartphone Apple iPhone 5S with installed and running operating system iOS 7, with Bluetooth, Wi-Fi, 3G, LTE.

The client device 102 also includes an information storage medium 104. In principle, such the information storage medium 104 can be of absolutely any nature or type, including RAM, ROM, disks (compact disks, DVDs, diskettes, hard disks, and so on), USB flash drives, solid state drives, magnetic tape drives, and so on, as well as combinations of these. In the client device 102 depicted in FIG. 1, the information storage medium 104 is realized as a flash drive with volume of 16 Gb.

The information storage medium 104 can hold user files and program instructions. In particular, the information storage medium 104 can hold software realizing the functions of a browser 106. In the general case, the general purpose of a browser 106 is to enable the user 140 of the service to exchange information with the server 120 via the communication network 110. The browser can be implemented as (without being limited thereto) as: Yandex™ browser, Google™ Chrome™, Internet™ Explorer™ browsers, various mobile search applications, and so on. In the client device 102, the browser 106 is realized as a mobile Yandex browser. It is important to keep in mind that any other commercially available or proprietary application can be used to realize non-limiting embodiments of the present technology.

As will be apparent to the person skilled in the art, in alternative embodiments of the present technology the data exchange needs not be done by means of the browser 106. As other non-limiting embodiments, the information exchange can occur with the use of a telephone network by means of receiving voice queries of the server 120, and by selecting answer variants either on the telephone key pad, or by voice. These technologies, known as Interactive Voice Response (IVR) systems, are well known in the prior art, have been widely introduced in telephone banking and other services, and for this reason shall not be specially discussed.

The client device 102 also includes a multi-touch screen 108, being a 4" touch screen with resolution of 640×1136, making it possible to present video information to the user of the service 120, and which can also be used as an information input device. Thus, the service user 140 has the ability to see various objects on the multi-touch screen 108 in the browser interface 106 of the client device 102, such as security questions chosen by the server 120 and sent to the client device 102 via the communication network 110 for checking the identity of the service user 140 in order to then restore the password. Responsive to the questions received, the service user 140 can enter the answers to the questions received by means of a touch key pad, which is available to the user in the graphic user interface displayed on the multi-touch screen 108.

Via the communication network 110, the client device 102 is connected to the server 120. The server 120 can be an ordinary computer server. As a non-limiting embodiment of the present technology, the server 120 can be a Dell™ PowerEdge™ server using the operating system Microsoft™ Windows Server™. Needless to say, the server 120 can be any other suitable hardware and/or software and/or system hardware. In the embodiment shown for the present technology, not limiting the scope, the server 120 is a single server. In other non-limiting embodiments of the present technology, the functionality of the server 120 can be distributed, and it can be implemented by several servers.

In certain embodiments of the present technology, the server 120 is under the control and/or supervision of a service provider, such as an email service, an online calendar service, an online data storage service, an online contact management service, and an online service for creating comments and organizing personal information. Thus, the server 120 can be implemented with the ability to provide one or more of the indicated services to the service user 140. These services and the methods of providing them are well known in the prior art and therefore shall not be discussed here.

The server 120 includes an information storage medium (not shown), which can be used by the server 120. In principle, such an information storage medium can be of absolutely any nature or type, including RAM, ROM, disks (compact disks, DVDs, diskettes, hard disks, and so on), USB flash drives, solid state drives, magnetic tape drives, and so on, as well as combinations of these.

Various embodiments of the server 120 are well known in the prior art. Suffice it to state that the server 120 contains, among other things, a network communication interface (not shown) for two-way communication by a communication network 110; and a processor (not shown), connected to the network communication interface, which is able to perform various procedures, including those described below. For this purpose, the processor can save or have access to machine-readable instructions, the execution of which initiates the processor to perform the various procedures described here.

The information storage medium of the server 120 is intended to store various information, including personal data of the service users, statistical data on the use of the different services by each of the users, and also to store machine-readable instructions enabling the authenticating himself of the services and the different modules, and storage of databases.

In the given embodiment of the present technology, the server 120 can include several modules.

In particular, the server 120 includes an email service module 122, providing the users with an email service.

The email service can be realized by any known method. In the given embodiment, the email service provides its users with electronic message sending and receiving in a distributed (including a global) communication network 110. In the present example, the email service uses the Simple Mail Transfer Protocol, or SMTP with DNS for obtaining the IP address for the host name, and the POPS (Post Office Protocol 3).

The email service enables storage of the account records of the users of the email service, user settings, and user content.

The server 120 also includes an online data storage service module 124. Cloud data storage is a service which provides to users a dedicated space on a remote server 120 to store information in the form of files and folders. As will be clear to the person skilled in the art, the remote server 120 can be realized as a number of servers (and this is generally how it is realized); the data in this case is stored and processed in the "cloud", which represents a single virtual server from the perspective of the client.

The user 140 can have various files in his online data storage: both default files, such as "My documents", "My photographs", and "Recent documents", and user folders created independently by the user 140. For example, the user 140 can create folders "Scans of my documents", "Graduation ceremony", "Physics assignments".

The online data storage service can also provide for storage of account records of the users of the online data storage service and user settings.

The email service enables storage of account records of the users of the email service, user settings, and user content.

The server 120 also includes an online calendar service module 126. The online calendar can allow the users to create and store events, tasks, birth days, other anniversaries, and so on. The online calendar service also enables the importing of events, tasks, birth days, other anniversaries, and the like, which are created by other persons.

The online calendar service also allows for a merging of several calendars created by different users, and the data from the different calendars can be marked in different colors.

The user 140 of the online calendar service can select the color of the online calendar interface and select the form of representation of information (displaying a day, an entire week, the work week, a month, and so on).

Thus, the graphic formatting of the online calendars of the different users can differ in color of interface, form of representation of information (weekly, monthly, etc.), colors of calendar elements coming from different sources, and so on.

Even though the user 140 may enter data in the calendar because he is not sure of his memory and needs a reminder, nevertheless the users usually remember certain entries in their calendars, or can reconstruct them without use of the calendar.

The server 120 also includes an online memo service 128. The online memo service is a web service and software package for creating and saving memos. A memo can be a fragment of formatted text, an entire web page, a photograph, an audio file, or a handwritten note.

Memos can also contain attachments with files of different type.

The user 140 can create notepads, assign names to the notepads created, and sort memos by notepad.

The user 140 can also assign labels to the memos.

The server 120 also includes a history module 130. The history module 130 interacts with the other modules of the server 120, namely, the email service module 122, the online data storage service module 124, the online calendar service module 126, and the online memo service module 128.

In order to use any of the services provided by the server 120, the user 140 must enter the system using his account record. Usually, the user 140 enters in the corresponding windows of the browser 106 on the client device 102 his username and password, which are sent by the communication network 110 to the server 120. Upon verifying the username/password pair, the session starts, and the user 140 can make use of one or more services to which he is connected.

Each time that the user 140 begins a session, data on the date and time of the start and end of the session and the services used is sent by the modules of the services used to the history module 130, which provides for storage of the corresponding records. In addition, other information may be saved. As was noted above, in this embodiment of the given technology the user 140 is a user of three services residing on the server 120, namely: email, online data storage ("cloud data storage"), and online calendar. Accordingly, the history module 130 can contain records on all the sessions of the user 140 during which the user made use of these three services: the email, online data storage, and online calendar services. Since the user 140 never made use of the online memo service, the online memo service module 128 never sent information about the user 140 to the history module 130.

The history module 130 is also connected to the password recovery module 132. The password recovery module 132 enables automatic recovery of password, freeing up the user 140 from the need to go to the user support center in person, by telephone, or consult an employee of the user support center in some other way. The basic principle of recovery of a lost password by the password recovery module 132 comprises authenticating of the person requesting recovery of a lost password as the true user 140. For this, the password recovery module 132 is configured to identify the true user 140, and discover unauthorized persons who are trying to gain access to the account record of the user 140 without his permission.

The identification of the true user 140 can be done by asking a series of questions of the person initiating the password recovery procedure, to which the user 140 is able to provide the correct or relatively accurate answer, yet an unauthorized person finds it hard or impossible to do so.

In order to make a preliminary gathering of information impossible or very difficult for an unauthorized person to guess, each person initiating the password recovery procedure may be asked nonrecurring questions (or nonrecurring/seldom recurring combinations of questions).

The asking of several questions of a person initiating the password recovery procedure is due to the fact that this rules out the chance of an unauthorized user guessing the correct answer. Furthermore, the asking of questions does not necessarily end automatically after receiving an incorrect (or insufficiently correct) answer, since the true user 140 might forget or lose sight of certain facts related to his experience of using the services and/or the user content, and accordingly he may give an untrue or insufficiently accurate answer to the question asked.

Questions whose correct or relatively accurate answers are known or should be known by the user 140 and not known (or should not be known) by unauthorized persons can be questions related to the services which were used by the user 140, and to the activity of the user 140 during the sessions when he used a particular service.

Accordingly, a series of questions can be asked in order to identify the true user 140. The questions being asked of the person who initiated the password recovery procedure can be selected by the password recovery module 132 from a database 134 of security questions, which is part of the question recovery module 132 or linked to it. The questions contained in the database 134 of security questions can be systematized so that each service provided by the server 120 will correspond to a separate special list of questions. Furthermore, all or some of the questions can also be related to information kept in the history module 130 in relation to the user 140. In certain embodiments of the present technology, the classification of the questions can be more far-reaching. For example, questions related to the email service might be divided into more specialized groups (for example, questions related to the interface; questions related to content; questions related to frequency of use of the email service). In some embodiments of the present technology, questions related to statistics of use of services by the user 140, the saving of which is provided by the history module 130, may be made into a separate group of questions (for example, questions as to when the user 140 used the services and which ones, how often did he use these services, how long did the sessions last, and so on).

Figure 2:
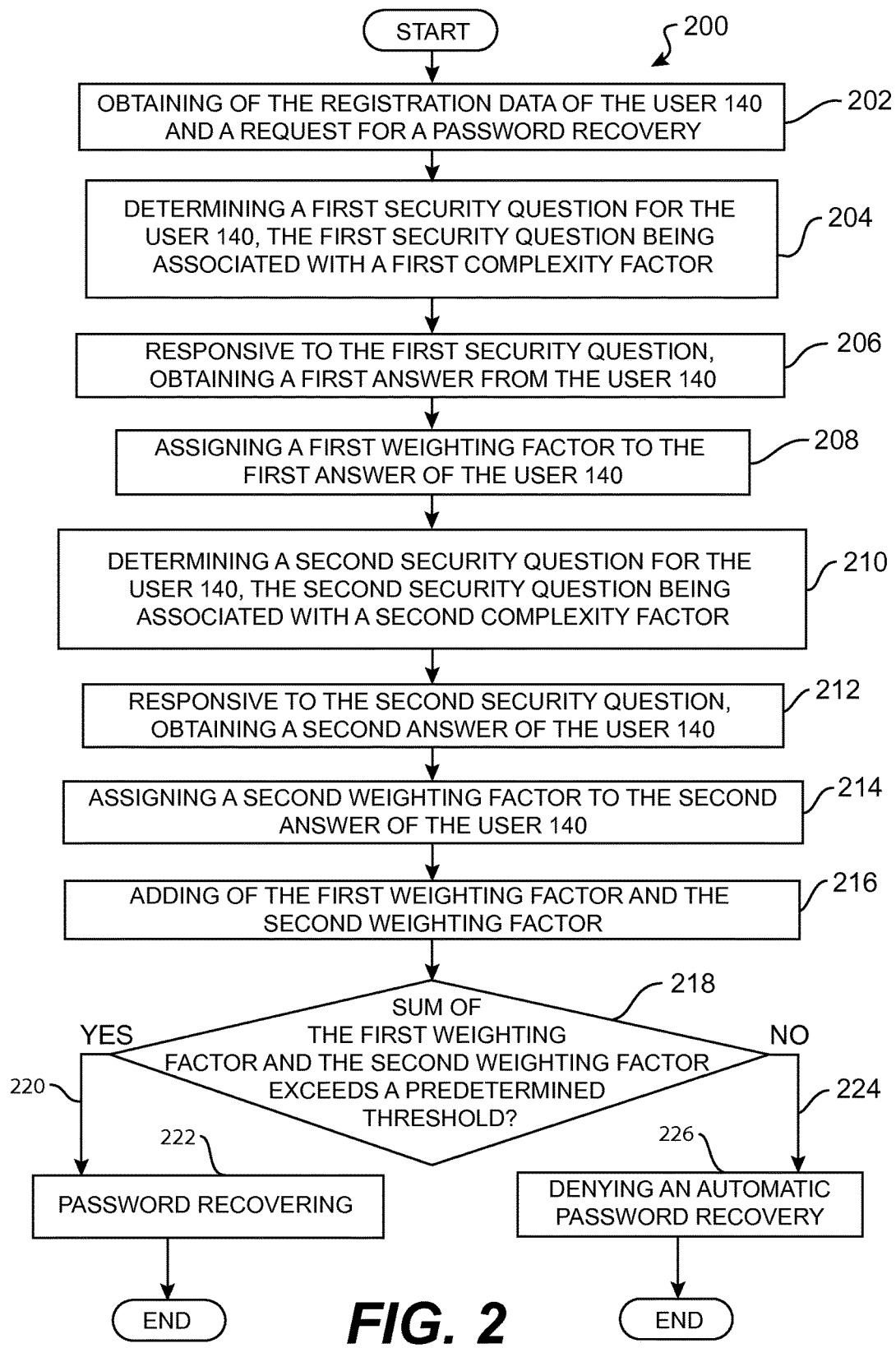
FIG. 2 is a block diagram of a method, being carried out on a server of the system of FIG. 1, and implemented in accordance with non-limiting embodiments of the present technology.

FIG. 2 is a block diagram of the method 200, implemented on the server 120 shown in FIG. 1, and implemented in accordance with non-limiting embodiments of the present technology. In the embodiments of the present technology, the method 200 can be implemented on the server 120 shown in FIG. 1. For this, the server 120 includes an information storage medium 104 which holds machine-readable instructions whose execution causes the server 120 to perform the steps of the method 200.

Step 202—obtaining by communication network 110 the registration data of the user 140 and a request for password recovery.

The method 200 starts at step 202, when the server 120, as shown in FIG. 1, receives by the communication network 110 from the client device 102 the registration data of the user 140. The registration data can be the username of the user 140, ordinarily used by the user 140 for authenticating himself with one of the services, the execution of which is provided by the server 120. The username of the user 140 can contain a combination of letters in upper and lower case, numbers, and special characters. In the example being described in the method 200, the user 140 makes an attempt to recover a lost password for the email service provided by the server 120. The user 140 enters his username ordinarily used to enter the email service, and presses the link "Recover password".

In some embodiments of the present technology, the user 140 can use the registration data of a different service than the email service as the registration data (for example, the user 140 can use his username to enter the online data storage service).

In some situations the user 140 can make use of registration data of a different service than the service provided by the server 120 as the registration data. This is possible when the account record of the user 140 on the outside service is correlated with the account record normally used for authenticating himself with one of the services provided by the server 120. For greater clarity, as non-limiting examples of services provided by different providers, but where a correlation is possible for one account record of the user in one service to another service, can include (without limitation thereto): the services of the social network Facebook™ and the service Skype™, where for example it is possible to initiate a Skype session by using the account record in the social network Facebook.

Typically, it is not enough to send the username to the server 120 in order to start a session. It is also necessary to send the password, which is needed to identify the person as the genuine user 140 of the service. However, in certain instances, the genuine user 140 cannot remember his password. Therefore, in order to continue using the services with his previously created account record, the user 140 needs to recover the password. For this, along with the registration data he sends a password recovery request by means of the client device 102 to the server 120 via the communication network 110. The password recovery request can be sent by any ordinary method known in the prior art, for example, by using the link "recover password" which is displayed on the multi-touch screen 108 of the client device 102 at the time when the user 140 tries to enter the service, for example, the email service.

The method 200 then moves on to step 204.

Step 204—determining of the first security question for the user 140, the first security question being associated with a first complexity factor, and asking the first security question of the user 140.

Next, in step 204, after obtaining the registration data of the user 140 and the password recovery request of the user 140, the password recovery module 132 determines a first security question for the user 140.

In the given embodiment of the present technology, each of the security questions is associated with at least one list of security questions. Each list of security questions from the group of lists of security questions is associated with at least one service. Thus, for example, a question as to the number of folders created by the user 140 for email messages can be associated with the list of questions associated with the email service. As another example, a question about the latest date for uploading a file to the online data storage can be associated with the list of questions associated with the online data storage service.

In the given embodiment of the present technology, some security questions included in the lists of security questions are generated based on the parameters of the account record of the user 140 on the service with which the corresponding list of security questions is associated. Example of such questions include: "Color of the interface of the email service", "Enter the address for automatic forwarding of email which you indicated in the settings of your account record", "Select the time zone chosen by you in the email parameters".

In the given embodiment of the present technology, the determining of the first security question for the user 140 is executed by the password recovery module 132 by means of selecting the first security question from a list of security questions kept in the database 134 of security questions, shown in FIG. 1 and described in detail hereafter, the list of security questions being associated with the registration data of the user 140.

For the choice of the first security question for the user 140, the password recovery module 132 interacts with the history module 130 and requests a list of services visited by the user 140. Responsive to the request, the history module 130 sends to the password recovery module 132 a list of the services visited by the user 140.

As noted above, the user 140 is a user of three services residing on the server 120, namely: email, online data storage ("cloud data storage"), and online calendar, and this information is transmitted by the history module 130 to the password recovery module 132.

Next, the password recovery module 132 selects a security question from one of the lists of security questions kept in the database 134 of security questions, the choice being made from a list associated with at least one of the following three services: email, online data storage ("cloud data storage"), and online calendar. As noted above, the server 120 also provides an online memo service. However, the user 140 has never made use of this service. Accordingly, the online memo service 128 has never sent information about the activity of the user 140 on it to the history module 130. Thus, the history module 130 does not provide to the password recovery module 132 information about the activity of the user on the online memo service, and for this reason the password recovery module 132 does not select security questions from the list (or lists) of questions associated with that particular service.

Since the user 140 initiated the password recovery procedure using his registration data on the email service, the choice of the first security question for the user 140 can be done from the list of questions associated with the email service. In the given embodiment of the present technology, the choice of the first security question is executed in a random order from the list of questions associated with the email service. However, as will be clear to the person skilled in the art, in alternative embodiments the first security question needs not be chosen in the random order; instead, the choice of the first security question can be predetermined by an algorithm. For example, the first security question may always involve the user settings on the given service.

In alternative embodiments of the present technology, the choice of the first security question for the user 140 can be done from any of the lists of security questions associated with any of the services which the user 140 has used and, accordingly, with which his account record is associated. The choice of the first question from several lists of security questions can be done in a random order. However, as will be clear to the person skilled in the art, in alternative embodiments the first security question needs not be chosen in the random order; instead, the choice of the first security question can be predetermined by an algorithm. For example, the first security question may always involve the most recent activity of the user 140 on any of the services.

In certain embodiments of the present technology, the registration data of the user 140 is associated with at least two services, and the first security question is chosen respectively from a first list of security questions associated with the first service. Accordingly, since the user 140 is a user of three services residing on the server 120, namely: email, online data storage ("cloud data storage"), and online calendar, the first question will be chosen by the password recovery module 132 from the list of questions associated with the email service, kept in the database 134 of security questions.

The first security question from the group of security questions is associated with a first complexity factor.

The complexity factor is a numerical value of the level of complexity of a particular question for an ordinary average user. The complexity factor may be higher for more complex security questions and the complexity factor may be lower for easier security questions.

The basis for the initial determination of the complexity factor of a particular question when entered into the database 132 of security questions is statistical data on the number of correct and incorrect answers to this question, or the degree of accuracy of the answer to this question. Such statistical data is generally in possession of the providers of the corresponding services. This data is obtained by the providers of the services as a result of processing of the operating data of the support centers where password recovery is executed by a specialist of the technical support service based on the results of a telephone conversation with the person having initiated the password recovery procedure. In the given embodiment of the present technology, the corresponding complexity factor of each security question from the group of security questions is predetermined and entered into the database 134 of security questions.

After the password recovery module 132 has chosen the first security question, the server 120 sends the first security question via the communication network 110 to the client device 102. The first security question is then displayed on the multi-touch screen 108 of the client device 102. The user 140 then enters the answer to the first security question, using the virtual key pad on the multi-touch screen 108 of the client device 102, or selects the correct answer from the proposed variants of possible answers. How exactly the user 140 will answer the first security question is not of major significance in the given technology. The answer to the first security question can be given by any customary method. Examples presented above (typing from virtual key pad and selection from a menu) are given solely as non-limiting examples. After entering (selecting) the answer to the question, the user 140 issues a command to send the answer to the first security question to the server 120 (for example, by pressing the virtual button "Send"). The user's answer is sent by the client device 102 to the server 120.

The method 200 then moves on to step 206.

Step 206—responsive to the first security question, obtaining of the first user's answer 140.

In step 206, after the user 140 has given the command to send the answer to the first security question to the server 120 (for example, by pressing the virtual button "Send"), the corresponding information is transmitted by the communication network 110 to the server 120, and the server 120 receives this information.

The method 200 then moves on to step 208.

Step 208—assigning a first weighting factor to the first user's answer 140, the assigned first weighting factor of the user's answer 140 being dependent on the first complexity factor of the first security question.

Next, in step 208, the first user's answer 140 is assigned a first weighting factor of the user's answer 140. The assigned first weighting factor of the user's answer 140 depends on the first complexity factor of the first security question. Thus, the higher the complexity factor of the question, the higher the weighting factor of the user's answer 140.

Besides the complexity factor of the question, the weighting factor of the user's answer can be influenced by other factors. For example, in the case of an absolutely wrong answer to the question, a zero factor can also be applied.

Thus, in such an embodiment of the present technology, the weighting factor of a wrong user's answer will always be equal to zero, regardless of the complexity of the question asked. In other embodiments, other coefficients may be used in order to assign different weighting factors to correct and wrong answers to the same question.

In some embodiments of the present technology, the method can further include a parameter of accuracy of the user's answer. Thus, the answers to the questions are not strictly divided into right and wrong. In this case, a certain range of accuracy of the answers can be used. If the answer to the question is within the range of permitted error, it is considered to be correct. For example, the user 140 of the email service is a student at the University of Quebec in Montreal and, as indicated above, has created on the email service a user folder UQàM (the abbreviation of Université du Québec à Montréal). The user 140 initiated a password recovery procedure. The password recovery module 132 consulted the history module 130 and requested a list of the services used by the user 140. The history module 130 sent to the password recovery module 132 the list of services used by the user 140, among which appears the email service. The module 132 consults the database 134 of security questions and in a random order selects a first security question from the list of security questions which is associated with the email service. Let us assume that the selected security question is as follows: "Give the name of any folder created by you on the email service". In response, the user 140 enters in the form used for this "UQaM". As can be seen from this example, the user did not answer this question exactly, since his answer leaves out the accent on the letter "a". Nevertheless, such an answer can be considered correct based on the routine to determine the accuracy and it considers that letters with and without accents are interchangeable. Similarly, the algorithm can consider that the same letters in upper case and lower case are interchangeable (that is, any of the answers "UQàM", "uqàm" and "UQÀM" would be considered correct in such a case. It should be noted that the examples given for considering an answer to be correct are only given for ease of explanation. Many other algorithms are possible. For example, the user 140 may be asked the question: "Give the email address to which you sent your last email message". If the last email message was sent to the address "johnsmith_2684@ alargecompany.org", the algorithm may consider those answers to be correct in which the top-level domain zone is given wrongly, such as the answers "johnsmith_2684@alargecompany.ru", "johnsmith_2684@alargecompany.com", "johnsmith_2684@alargecompany.ca" and so on.

In some embodiments of the present technology, where the method can further include a parameter of accuracy of the user's answer, the weighting factor of the user's answer which is assigned to the user's answer to the corresponding security question will additionally depend on the degree of accuracy of the corresponding user's answer to the corresponding security question. Thus, for example, when calculating the weighting factor of the user's answer, various reduction factors may be used, depending on the type of error committed. For example, in the case of an absolutely wrong answer, a factor of 1 may be used. If an answer is entered with a mistake of case, the reduction factor might be equal to 0.95; if a mistake indicating the top-level domain zone, the reduction factor might be equal to 0.7; for a mistake in giving the date of the last message sent, plus or minus 1 day, the factor might be 0.2 if the message was sent within the preceding 7 days, or 0.9 if the message was more than one month ago; and so on.

The method 200 then moves on to step 210.

Step 210—determining of the second security question for the user 140, the second security question being associated with a second complexity factor, and asking the second security question of the user 140.

Next, in step 210, the password recovery module 132 determines a second security question for the user 140.

In the given embodiment of the present technology, each of the security questions is associated with at least one list of security questions. Each list of security questions from the group of lists of security questions is associated with at least one service. Thus, for example, a question as to the number of folders created by the user 140 for email messages can be associated with the list of questions associated with the email service. As another example, a question about the latest date for uploading a file to the online data storage can be associated with the list of questions associated with the online data storage service.

In the given embodiment of the present technology, some security questions included in the lists of security questions are generated based on the parameters of the account record of the user 140 on the service with which the corresponding list of security questions is associated. Example of such questions include: "Color of the interface of the email service", "Select from the dropdown menu the type of the last file which you uploaded to the online data storage", and so on.

In the given embodiment of the present technology, the determining of the security question for the user 140 is executed by the password recovery module 132 selecting a security question from a list of security questions kept in the database 134 of security questions, the list of security questions being associated with the service which is associated with the registration data of the user 140.

For selecting thereafter a second security question for the user 140, the password recovery module 132 interacts with the history module 130 and requests a list of services visited by the user 140. Responsive to the request, the history module 130 sends to the password recovery module 132 the list of services visited by the user 140.

As noted above, the user 140 is a user of three services residing on the server 120, namely: email, online data storage ("cloud data storage"), and online calendar, and this information is transmitted by the history module 130 to the password recovery module 132.

Next, the password recovery module 132 selects a second security question from one of the lists of security questions kept in the database 134 of security questions, the selection being made from a list associated with at least one of the following three services: email, online data storage ("cloud data storage"), and online calendar. As was indicated above, the server 120 also provides an online memo service. However, the user 140 has never made use of this service. Accordingly, the online memo service 128 has never sent information about the activity of the user 140 on it to the history module 130. Thus, the history module 130 does not provide to the password recovery module 132 information about the activity of the user on the online memo service, and for this reason the password recovery module 132 does not select security questions from the list (or lists) of questions associated with that particular service.

Even though the user 140 initiated the password recovery procedure with the use of his own registration data on the email service, the choice of the second security question for the user 140 can be done from a list of questions which is associated not with the email service, but with another service which the user 140 has used. In the given embodiment of the present technology, the choice of the second security question is executed in a random order from a second list of questions, that is, not from the list of questions associated with the email service. In the given example, the second list of security questions is a list of security questions which is associated with the online data storage service.

As will be clear to the person skilled in the art, in alternative embodiments the second security question needs not be chosen in the random order from the second list of security questions; on the contrary, the choice of the second security question can be predetermined by an algorithm. For example, the second security question can always involve the user settings on the given service (that is, in this example, on the online data storage service).

In alternative embodiments of the present technology, the choice of the second security question for the user 140 can be done from any of the lists of security questions associated with any of the services which the user 140 has used and, accordingly, with which his account record is associated. The choice of the second security question from several lists of security questions can be done in a random order. However, as will be clear to the person skilled in the art, in alternative embodiments the second security question needs not be chosen in the random order; instead, the choice of the second security question can be predetermined by an algorithm. For example, the second security question may always involve the most recent activity of the user 140 on any of the services.

In certain embodiments of the present technology, the registration data of the user 140 is associated with at least two services, and the second security question is chosen respectively from a second list of security questions associated with the second service. Accordingly, since the user 140 is a user of three services residing on the server 120, namely: email, online data storage ("cloud data storage"), and online calendar, the second question will be chosen by the password recovery module 132 from the list of questions associated with the online data storage ("cloud data storage") service, kept in the database 134 of security questions.

The second security question from the group of security questions, like the first security question from the group of security questions, is associated with a second complexity factor.

After the password recovery module 132 has chosen the second security question, the server 120 sends the second security question via the communication network 110 to the client device 102. The second security question is then displayed on the multi-touch screen 108 of the client device 102. The user 140 then enters the answer to the second security question, using the virtual key pad on the multi-touch screen 108 of the client device 102, or selects the correct answer from the proposed variants of possible answers. How exactly the user 140 will answer the first security question is not of major significance in the given technology. The answer to the first security question can be given by any customary method. Examples presented above (typing from virtual key pad and selection from a menu) are given solely as non-limiting examples. After entering (selecting) the answer to the question, the user 140 issues a command to send the answer to the second security question to the server 120 (for example, by pressing the virtual button "Send"). The user's answer is sent by the client device 102 to the server 120.

The method 200 then moves on to step 212.

Step 212—responsive to the second security question, obtaining of the second user's answer 140.

In step 212, after the user 140 has given the command to send the answer to the second security question to the server 120 (for example, by pressing the virtual button "Send"), the corresponding information is transmitted by the communication network 110 to the server 120, and the server 120 receives this information.

The method 200 then moves on to step 214.

Step 214—assigning a second weighting factor to the second user's answer 140, the assigned second weighting factor of the user's answer 140 being dependent on the second complexity factor of the second security question.

Next, in step 214, the second user's answer 140 is assigned a second weighting factor of the user's answer 140. The assigned second weighting factor of the user's answer 140 depends on the second complexity factor of the second security question. Thus, the higher the complexity factor of the question, the higher the weighting factor of the user's answer 140.

Besides the complexity factor of the question, the weighting factor of the user's answer can be influenced by other factors. For example, in the case of an absolutely wrong answer to the question, a zero factor can also be applied. Thus, in such an embodiment of the present technology, the weighting factor of a wrong user's answer will always be equal to zero, regardless of the complexity of the question asked. In other embodiments, other coefficients may be used in order to assign different weighting factors to correct and wrong answers to the same question.

In some embodiments of the present technology, the method can further include a parameter of accuracy of the user's answer. Thus, the answers to the questions are not strictly divided into right and wrong. In this case, a certain range of accuracy of the answers can be used. If the answer to the question is within the range of permitted error, it is considered to be correct. For example, the user 140 of the email service is at the same time a user of an online data storage service. The user 140 made use of the online data storage service one time in the current month, uploading to the server 120 from the client device 102 in the communication network 110 the file "mesdevoirs.docx", being a document in Microsoft Word format. The user 140 has initiated the password recovery procedure. The password recovery module 132 has consulted the history module 130 and requested a list of services used by the user 140. The history module 130 sent to the password recovery module 132 the list of services used by the user 140, among which appears the online data storage service. The module 132 consults the database 134 of security questions and in a random order selects a first security question from the list of security questions which is associated with the online data storage service. Let us assume that the chosen security question is as follows: "Enter the name of the last file uploaded by you". In response, the user 140 enters in the form provided for this "mesdevoirs.doc". As can be seen from this example, the user did not answer the question entirely correctly, since he indicated a different document extension in the same Microsoft Word format. Even so, such an answer can be recognized as the correct answer based on the routine for determining the accuracy and it considers that the wrongly indicated file extension in Microsoft Word format, if such a wrong extension is also associated with files in Microsoft Word format, are interchangeable. Similarly, the algorithm may consider that identical letters in lower case and upper case are interchangeable (that is, any of the answers "mesdevoirs.docx", and "MESDEVOIRS.DOCX" would be considered correct in this case). It should be noted that these examples for considering an answer to be correct are given only for ease of explanation. Many other algorithms are possible.

In some embodiments of the present technology, where the method can further include a parameter of accuracy of the user's answer, the weighting factor of the user's answer which is assigned to the user's answer to the corresponding security question will additionally depend on the degree of accuracy of the corresponding user's answer to the corresponding security question. Thus, for example, when calculating the weighting factor of the user's answer, various reduction factors may be used, depending on the type of error committed. For example, in the case of an absolutely wrong answer, a factor of 1 may be used. If an answer is entered with a mistake of case, the reduction factor might be equal to 0.95; if a mistake indicating the date of the last file uploading, plus or minus 1 day, the factor might be 0.2 if the upload was done within the preceding 7 days, or 0.6 if this upload was done more than one month ago; and so on.

The method 200 then moves on to step 216.

Step 216—adding of the first weighting factor and the second weighting factor.

In step 216, the password recovery module 132 performs a mathematical adding of the first weighting factor of the first answer and the second weighting factor of the second answer.

The method 200 then moves on to step 218.

Step 218—determining of whether the sum of the first weighting factor and the second weighting factor exceeds a predetermined threshold.

In step 218, the password recovery module 132 checks whether the sum of the first weighting factor and the second weighting factor exceeds a predetermined threshold.

The predetermined threshold can have a numerical value.

The predetermined threshold can be preprogrammed and saved on the server 120. The value of the predetermined threshold during the programming stage can be previously determined on the basis that this value can be reached by correctly (or relatively correctly) answering all questions, or correctly (relatively correctly) answering some questions. Thus, by correctly (relatively correctly) answering the sequence of questions, the sum of the weighting factors of the user may reach the predetermined threshold.

Next, if the sum of the first weighting factor and the second weighting factor exceeds the predetermined threshold (step 220), the method 200 goes on to step 222.

Step 222—automatic password recovery.

In step 222, having established that the sum of the first weighting factor and the second weighting factor exceeds the predetermined threshold, the password recovery module 132 makes a decision to recover the password and performs other actions needed for the password recovery. For example, the password recovery module 132 can send to the user 140 a temporary password on the client device 102 through the communication network 110, enabling a changing of the old password to a new one.

Step 226—denying of automatic password recovery.

Returning to step 218, let us assume that the sum of the first weighting factor and the second weighting factor did not exceed the predetermined threshold. In this case, the password recovery module 132 makes a decision not to recover the password. The module 132 can also take other actions related to the decision made not to recover the password. For example, the password recovery module 132 can send to the user 140 on the client device 102 via the communication network 110 a notice as to alternative methods of password recovery, such as the possibility of going in person to the technical support service and submitting documents establishing the identity of the user 140.

In alternative embodiments of the present technology, in the case when the sum of the first weighting factor and the second weighting factor does not exceed the predetermined threshold, this might not result in making a decision to deny the automatic password recovery. Thus, in alternative embodiments of the present technology, it may be arranged to ask a larger number of questions than two. In such a case, if the sum of the first weighting factor and the second weighting factor exceeds a predetermined threshold, the password is recovered, and if not then a third security question is asked. If the sum of the first weighting factor, the second weighting factor, and the third weighting factor does not exceed a predetermined threshold, then a fourth security question is asked, and so on.

In addition, in certain embodiments of the present technology a maximum number of security questions asked of the user in the course of one password recovery session can be predetermined. For example, the maximum number of security questions asked of the user during one password recovery session can be set equal to five. In this case, the method further includes a determining of whether the number of security questions asked exceeds the maximum permitted number of security questions. If the number of security questions asked exceeded the maximum permitted number of security question, and the sum of the weighting factors of all the answers to all questions asked did not exceed the predetermined threshold, the password recovery module 132 makes a decision to deny the automatic password recovery. However, if the number of security questions asked did not exceed the maximum permitted number of security questions, and the sum of the weighting factors of all the answers to all the questions asked did not exceed the predetermined threshold, the password recovery module 132 selects the next question from the database 134 of security questions to ask of the person who initiated the password recovery procedure. It should be kept in mind that the third and every successive question can be selected from any given list of security questions, provided this list is associated with a service which the user 140 has uses. To the third and every successive answer to the third and every successive answer are assigned third and successive weighting factors, similar to how weighting factors are assigned to the first and second answers.

In certain embodiments of the present technology, the method may further include correction of the corresponding complexity factor of the corresponding security question, taking into account statistics of the answers of the user 140 and previous users to the corresponding question.

Thus, in the case when the ratio of the number of correct and incorrect answers to a given question asked of different users changes in the direction of an increase as compared to the ratio used when calculating the original complexity factor, the complexity factor of the question will be reduced. On the other hand, when the ratio of the number of correct and incorrect answers to a given question asked of different users changes in the direction of a decrease as compared to the ratio used when calculating the original complexity factor, the complexity factor of the question will be increased.

In other words, the more often the users correctly answer the question and they fewer mistakes they make, the easier the given question will be considered and, accordingly, the lower will be the complexity factor. For example, a given security question was asked 45 times of different persons who initiated the password recovery procedure. As a result of performing the procedure, the password was recovered 44 times, that is, 44 times the initiators of the password recovery procedure were acknowledged to be the users. Our of 44 users, 40 answered this question correctly. Accordingly, the complexity factor is 44/40, or in other words, 1.1.

Let us assume that a user 140 has initiated the password recovery procedure, and the password was recovered. In the course of the password recovery procedure the user 140 gave a wrong answer to the given question. Thus, the new password complexity factor becomes equal to 45/40 (45 users gave the right answer 40 times), or in other words, 1.125. As can be seen from this example, the complexity factor changed (it increased, which reflects the increased complexity of the question, from the standpoint of the ongoing statistics).

In certain embodiments of the present technology, in a case where the ratio of correct and incorrect answers to a corresponding security question, the answers being given by the user and the previous users, exceeds a predetermined value, the method may additionally include removal of the corresponding security question from at least one list of security questions. For example, it can be arranged to remove from the lists of questions those questions to which the initiators of password recovery procedures for whom the password was subsequently recovered gave incorrect answers more than 50 percent of the time.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

The invention claimed is:

1. A method of automatic password recovery of a password for a user account associated with one or more web services hosted by a first server, the user account associated with a user, the password being a part of user credentials, the user credentials for accessing the one or more web services using an electronic device, the method executed at a second server, the method comprising:
   (i) obtaining, via a communication network, user registration data of the user account and a request password restoration from the electronic device of the user;
   (ii) determining a first security question for the user, the first security question based on prior user interaction with the one or more web services, the first security question being associated with a first complexity factor, the first complexity factor being indicative of a level of complexity of the first security question, the first complexity factor being based on a number of past correct and incorrect answers from other users to the first security question;
   (iii) causing the first security question to be asked to the user;
   (iv) responsive to the first security question, obtaining the first answer from the user;
   (v) assigning a first weighting factor to the first user's answer, the first assigned weighting factor of the user's answer depending on the first complexity factor of the first security question;
   (vi) determining of a second security question to be asked of the user, the second security question based on prior user interaction with one or more web services, the second security question being associated with a second complexity factor, the second complexity factor being indicative of a level of complexity of the second security question, the second complexity factor being based on a number of correct and incorrect answers from other users to the second security question;
   (vii) causing the second security question to be asked to the user;
   (viii) responsive to the second security question, obtaining the second answer from the user;
   (ix) assigning a second weighting factor to the second user's answer, the second assigned weighting factor of the user's answer depending on the second complexity factor of the second security question;
   (x) adding up the first weighting factor and the second weighting factor;
   (xi) if the sum of the first weighting factor and the second weighting factor exceeds a given threshold, automatically restoring the password;
   (xii) if the sum of the first weighting factor and the second weighting factor is below the given threshold, denying automatic password restoration.

2. The method according to claim 1, wherein the first security question and the second security question are security questions from a group of security questions, each security question from the group of security questions being included in at least one list of security questions, and wherein each list of security questions from the group of lists of security questions is associated with the one or more web services associated with the user registration data.

3. The method according to claim 2, wherein at least one of the security questions included in the list of security questions is generated based on the parameters of the user's account record in the one or more web services, with which a corresponding list of security questions is associated.

4. The method according to claim 2, wherein the determining of the user's security question is executed by selecting a security question from the list of security questions, the list of security questions being associated with the one or more web services associated with the user registration data.

5. The method according to claim 4, wherein the selecting of the security question from the list of security questions associated with the one or more web services associated with the user registration data is executed in a random order.

6. The method according to claim 2, wherein the user registration data is associated with the one or more web services, and the first security question and the second security question are selected respectively from a first list of security questions and a second list of security questions, the first list of security questions and the second list of security questions being associated respectively with a first service and a second service.

7. The method according to claim 2, wherein each security question from the group of security questions has a corresponding complexity factor, the corresponding complexity factor of each security question from the group of security questions being predetermined.

8. The method according to claim 7, further comprising correcting a corresponding complexity factor of a corresponding security question based on statistics of the answers of previous users to the corresponding security question.

9. The method according to claim 1, wherein the first security question and the second security question are parts of a group of security questions, and a maximum number of security questions asked of the user in the course of a single password recovery session is predetermined.

10. The method according to claim 9, wherein if the sum of the first weighting factor and the second weighting factor is below the predetermined threshold, the method further comprises:
   (i) determining of whether the number of security questions asked has reached the maximum predetermined number of security questions,
   (ii) if the number of security questions asked has reached the maximum predetermined number of security questions, denying automatic password restoration,
   (iii) if the number of security questions asked is below the maximum predetermined number of security questions, causing a third security question to be asked to the user.

11. The method according to claim 10, further comprising:
   (i) responsive to the third security question, obtaining a third user's answer;
   (ii) assigning to the third user's answer a third weighting factor, the assigned third weighting factor being dependent on a third complexity factor of the third security question, and
   wherein the third security question being selected from one of:
      the first list of security questions, and
      the second list of security questions, and
      a third list of security questions, the third list of security questions being associated with one of:
         a first service, and
         a second service, and
         a third service associated with the user registration data.

12. The method according to claim 1, wherein the weighting factor of the user's answer being assigned to the corresponding user's answer to the corresponding security question further depends on the degree of accuracy of the corresponding user's answer to the corresponding security question.

13. The method according to claim 12, further comprising calculating a parameter of accuracy of the user's answer.

14. The method according to claim 2, further comprising, when the ratio of correct and incorrect answers to the corresponding security question, the answers being given by the user and by previous users, exceeds a predetermined value, eliminating the corresponding security question from at least one of the lists of security questions.

15. A computer, comprising:
   a processor, the processor being configured to cause the computer to:
   (i) obtain, via a communication network, user registration data of a user account associated with a user and a request password restoration from an electronic device associated with the user;
   (ii) determine a first security question of the user, the first security question based on prior user interaction with one or more web services, the first security question being associated with a first complexity factor, the first complexity factor being indicative of a level of complexity of the first security question, the first complexity factor being based on a number of past correct and incorrect answers from other users to the first security question;
   (iii) cause the first security question to be asked to the user;
   (iv) responsive to the first security question, obtain the first user's answer;
   (v) assign to the first user's answer a first weighting factor, the assigned first weighting factor of the user's answer depending on the first complexity factor of the first security question;
   (vi) determine a second security question to ask the user, the second security question based on prior user interaction with one or more web services, the second security question being associated with a second complexity factor, the second complexity factor being indicative of a level of complexity of the second security question, the second complexity factor being based on a number of correct and incorrect answers from other users to the second security question;
   (vii) cause the user the second security question to be asked to the user;
   (viii) responsive to the second security question, obtain the second user's answer;
   (ix) assign a second weighting factor to the second user's answer, the assigned second weighting factor of the user's answer depending on a second complexity factor of the second security question;
   (x) add the first weighting factor and the second weighting factor;
   (xi) if the sum of the first weighting factor and the second weighting factor exceeds a predetermined threshold, automatically restore the password;
   (xii) if the sum of the first weighting factor and the second weighting factor below the predetermined threshold, deny the automatic password restoration.

16. The method of claim 1, wherein the first server and the second server are a single server.

17. The method of claim 1, wherein the first server and the second server are different servers.

* * * * *